US009810815B2

(12) United States Patent
Mackinnon et al.

(10) Patent No.: US 9,810,815 B2
(45) Date of Patent: Nov. 7, 2017

(54) APPARATUS AND METHOD FOR COATING LENSES (71) Applicant: JELIGHT COMPANY, INC., Irvine, CA (US)

(72) Inventors: Andrew J. Mackinnon, Irvine, CA (US); Andrew James Garcia, Redondo Beach, CA (US); Marinko Jelic, Irvine, CA (US); Dick Amen, Westminster, CA (US)

(73) Assignee: JELIGHT COMPANY, INC., Irvine, CA (US)

( * ) Notice: Subject to any disclaimer, the term of this patent is extended or adjusted under 35 U.S.C. 154(b) by 0 days.

(21) Appl. No.: 14/630,598

(22) Filed: Feb. 24, 2015

(65) Prior Publication Data
US 2016/0243578 A1 Aug. 25, 2016

(51) Int. Cl.
| | |
|---|---|
| *B05B 5/00* | (2006.01) |
| *B05C 13/02* | (2006.01) |
| *G02B 1/14* | (2015.01) |
| *B05B 12/00* | (2006.01) |
| *B05B 12/04* | (2006.01) |
| *G02B 1/12* | (2006.01) |
| *B05D 3/06* | (2006.01) |

(52) U.S. Cl.
CPC .............. *G02B 1/14* (2015.01); *B05B 12/004* (2013.01); *B05B 12/04* (2013.01); *G02B 1/12* (2013.01); *B05D 3/067* (2013.01); *B05D 2258/02* (2013.01)

(58) Field of Classification Search
USPC .............. 118/500, 33, 52, 56, 319, 320, 58, 118/641–643, 300, 66
See application file for complete search history.

(56) References Cited

U.S. PATENT DOCUMENTS

| | | | | | |
|---|---|---|---|---|---|
| 5,097,136 | A | * | 3/1992 | Meyer ................... | B05D 3/067 250/492.1 |
| 5,399,227 | A | * | 3/1995 | Abrams .............. | B29C 65/7841 156/538 |
| 5,514,214 | A | * | 5/1996 | Joel ........................ | B05D 1/005 118/300 |
| 2004/0033768 | A1 | * | 2/2004 | Diehl ...................... | B23Q 7/02 451/339 |
| 2005/0208212 | A1 | * | 9/2005 | Jallouli .................... | B05C 3/09 427/169 |
| 2009/0029061 | A1 | * | 1/2009 | Shinde ................ | B05B 13/0228 427/508 |
| 2010/0129181 | A1 | * | 5/2010 | Blasiak .................. | B25J 13/087 414/4 |

* cited by examiner

Primary Examiner — Yewebdar Tadesse
(74) Attorney, Agent, or Firm — Smyrski Law Group, A P.C.

(57) ABSTRACT

The present design includes a coating apparatus having a mechanical arm configured to receive and maintain a lens in a desired orientation, a coating station configured to coat the lens, a drying/curing station configured to dry the lens using radiant energy, and a programmable controller configured to control the mechanical arm to move along a linear track between the coating station and drying/curing station and expose the lens to the coating station for a coating procedure and the drying/curing station for a drying procedure for a predetermined amount of time. Other stations, such as a washing station and a loading station, may be provided.

21 Claims, 9 Drawing Sheets

APPARATUS AND METHOD FOR COATING LENSES

BACKGROUND

I. Field

The present disclosure relates generally to coating lenses, and more specifically to techniques and devices useful in providing coatings to ophthalmic lenses.

II. Background

Ophthalmic lenses made out of organic materials (also called plastic lenses) are currently employed in a variety of eyeglasses, safety goggles, and the like. Such lenses are very lightweight, fabricated from materials such as polycarbonate, and have virtually replaced other materials such as glass. However, while modern ophthalmic lenses are durable and light, a significant issue with plastic ophthalmic lenses is scratch resistance, and for this reason virtually all ophthalmic lenses are coated with a hard coating, frequently a urethane based coating that is typically reactive to ultraviolet (UV) light.

Certain procedures have been developed that apply hard coatings to ophthalmic lenses, but these procedures and systems suffer from two major drawbacks: they tend to be labor intensive and/or tend to direct air or some other gas toward the lens for drying purposes, both of which are undesirable. Certain machines have been developed to automate the process, but in some instances, particularly with specialty glasses or small producers of such lenses, an operator is required to position the lenses, typically on a support that at least partially obscures an edge or a side of each lens, coat the lenses, reposition the lenses such that the region supported is coated, and coat the remaining side of each lens. The coated lens must be dried in some manner, possibly at multiple times during the procedure, and air pressure drying is typically employed. The problem with this procedure is that an operator must perform each of these steps, and they can be time consuming, and lenses output per hour can be limited. Further, when repositioning the lenses, the coating can pick up small particles and if the particles dry within the coating a lens can be deemed useless. Thus the need to reposition and dry multiple times is potentially problematic and costly.

Further, whether the lenses are positioned manually by an operator or by an automated process, they are dried using a gas, typically air but different types of gases have been employed (oxygen, etc.), expelled in the direction of the coated lens or lenses for a period of time, resulting in a dry product. Compressed gasses can be problematic, resulting in small particles being blown over the coatings with the gas when drying or curing the coating. While compressed gasses can be of varying qualities and purities, such gasses are never completely free of particulates, and in some cases can include a significant number of particulates. Further, other sources of particles may exist, including but not limited to particles generated by pneumatic cylinders, control valves, and vacuum generators. With respect to compressed gasses, the cost of compressed gasses tends to correlate with quality, but even the highest quality compressed gas is not particulate free. As with the repositioning discussed above, providing gas containing small particles over coatings can result in such particles sticking to the coatings, which when dried result in an unacceptable lens. Once the coating is dried, it is very difficult or impossible to be removed from the ophthalmic lens, and imperfections in eyeglasses and goggles are simply unacceptable.

Additionally, the friction of blown gasses can generate surface static electrical charges, and directing gases toward or across a lens can result in a small charge being applied to the lens or coated lens, which may draw fine particles to the lens. This too is undesirable, and thus techniques other than directing gasses toward the lens can provide benefits to the overall lens coating process.

A process and/or device that reduces or eliminates ophthalmic lens coating issues such as necessity for an operator and/or air drying issues is thus desirable.

SUMMARY

According to a first aspect of the present design, there is provided a coating apparatus comprising a mechanical arm configured to receive and maintain a lens in a desired orientation, a coating station configured to coat the lens, a drying/curing station configured to dry the lens using radiant energy, and a programmable controller configured to control the mechanical arm to move along a linear track between the coating station and drying/curing station and expose the lens to the coating station for a coating procedure and the drying/curing station for a drying procedure for a predetermined amount of time. Other stations may be provided, such as a washing station and a loading station.

According to a second aspect of the present design, there is provided a lens coating apparatus comprising means for coating at least one side of an optical lens, means for drying/curing the optical lens using radiant energy, means for receiving the optical lens and maintaining the optical lens in a desired orientation, and means for controlling position of the optical lens by directing the receiving means along a linear track to facilitate coating the optical lens using the coating means and drying the optical lens using the drying means.

According to a third aspect of the present design, there is provided a method for processing an optical lens. The method includes receiving and maintaining the optical lens using a mechanical arm configured to maintain the optical lens in a desired orientation, directing the mechanical arm maintaining the optical lens to an optical lens coating position and coating at least one side of the optical lens, and directing the mechanical arm maintaining the optical lens to an optical lens drying/curing position and drying the optical lens using radiant energy. The mechanical arm is controlled to move along a linear track between the optical lens coating position and the optical lens drying/curing position.

Various aspects and features of the disclosure are described in further detail below.

DETAILED DESCRIPTION

The present design is directed to a system for coating lenses, including but not limited to coating ophthalmic lenses with an appropriate coating, such as a urethane based coating, using a multiple station machine that does not dry coated lenses by blowing air or compressed air across or directly at the lenses. The basic device presented herein includes a loading (and unloading) station wherein the lenses are loaded into a machine having a closed chamber expressly for this purpose, a washing station where the lenses are washed using a high pressure water jet stream, typically while being spun, a coating station where the lenses are coated, and a drying or curing station wherein the lenses are dried when wet or cured when coated using a heating lamp rather than compressed air. In one embodiment, all stations are enclosed within an enclosure to reduce risk of contamination. Movement of the lenses between the various stations occurs using automated and controlled movement, via a controller such as a PLC, such that once the lenses are loaded and the door to the enclosure closed, the apparatus begins to operate and no further contact by operator(s) is required. In normal operation, no further contact by operators is permitted. The present design may be all electric, essentially lubrication free in the processing area, where the linear slide mechanisms, spinning assemblies, and other components are free from grease and oil. The end result of processing using the current design is a set of lenses that has been coated with less risk of contamination by particles or contamination resulting from external contaminants.

Figure 1:
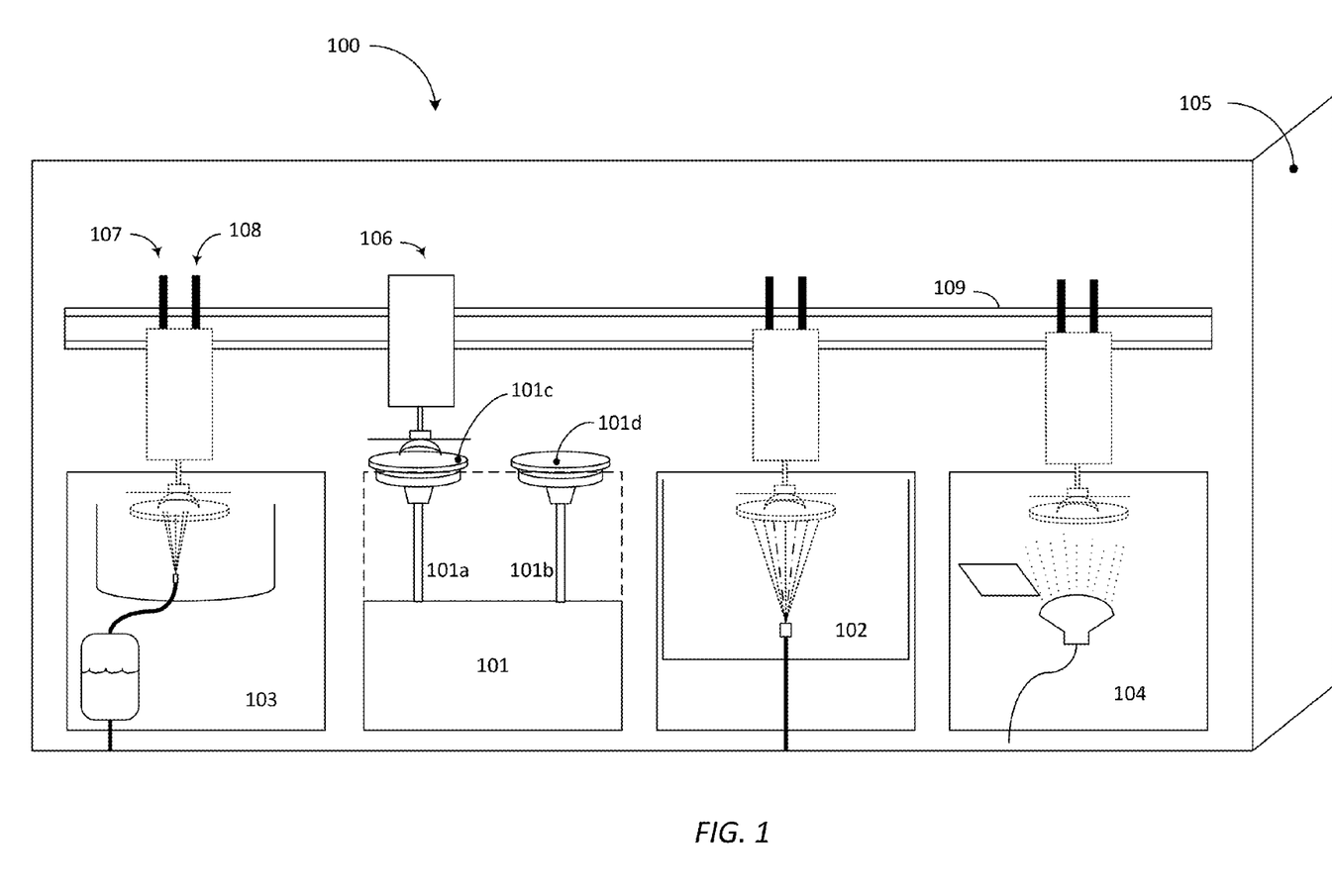
FIG. 1 shows a conceptual overview of the present design.

FIG. 1 shows a general conceptual overview of the present design. From FIG. 1, enclosure 100 includes loading station 101, also called loading/unloading station, including in this embodiment two stands 101a and 101b configured to receive lenses 101c and 101d, such as ophthalmic optical lenses. An operator opens door 105 and places at least one lens and in most cases two complimentary lenses on a stand or the stands, one lens per stand. Mechanical arm 106 is configured to move linearly between the four stations shown and also up and down on rails 107 and 108 to facilitate the cleaning and coating processes. Mechanical arm 106 may select one lens and transport the one lens to washing station 102 wherein the lens is washed in water or other cleaning solution, and the lens may be spun to remove water or cleaning solution. Mechanical arm 106 is shown with dotted lines in the various positions at stations other than loading station 101, and in certain instances is indicated to have traveled down rails 107 and 108.

The lens may then be transferred by mechanical arm 106 to drying/curing station 104 where it is dried using, for example, a radiation source such as an ultraviolet lamp. Drying/curing station 104 is used to dry a wet lens and to cure a coated lens, but can be used for either drying or curing as desired. Separate drying and curing stations may alternately be provided. A shutter is shown in FIG. 1 and described in further detail below, and the shutter is opened when radiant energy is required for drying and closed when such radiant energy is not required. The lens may then be provided to the coating station 103, where the lens is sprayed and coated and may be spun while being coated, where spinning tends to facilitate an even coating on the lens. Finally, the lens is transported by the mechanical arm 106 to the drying/curing station 104, also called the UV station, where the coated lens is dried or cured using UV light. Mechanical arm 106 travels linearly along track 109 between the various stations shown.

Figure 2A:
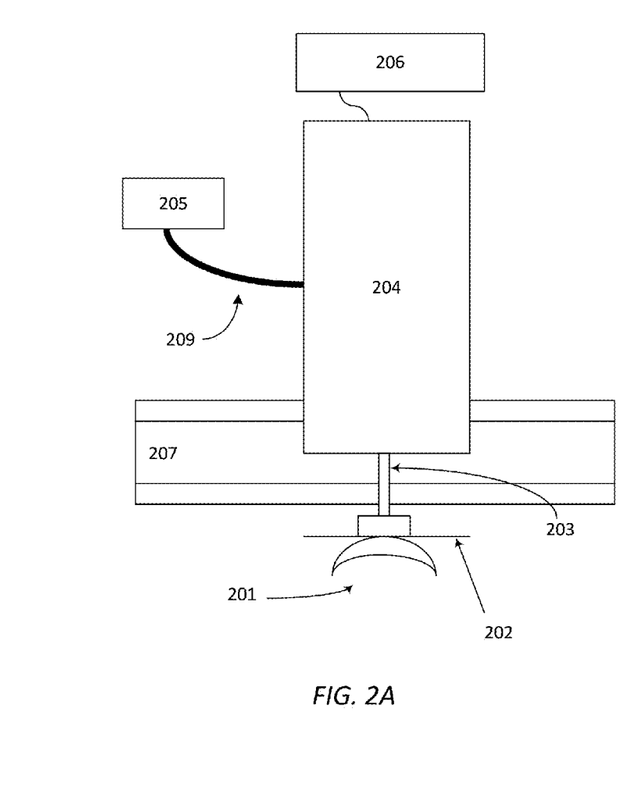
FIG. 2A is a representation of the mechanical arm employed in the present design.

FIG. 2A provides a more detailed view of the mechanical arm 106. From FIG. 2A, a suction cup 201 is provided at the bottom of mechanical arm, and suction cup 201 is attached to guard 202 which keeps liquid from splashing or being directed upward. Guard 202 or pieces attached to guard 202 are attached to piece 203, which may be a hollow metal tube that permits gas to pass through and can be spun, thereby spinning both guard 202 and suction cup 201. Mechanical arm 106 also includes cylinder 204, which together with associated equipment, such as a rotating element (not shown) inside cylinder 204 and a pressure source, enables spinning of piece 203 and a suction to be applied to suction cup 201. Thus an air source or other gas source may be attached to or provided with cylinder 204, a representation of which is shown as gas source 205, and a power source 206 is also provided. In one embodiment, mechanical arm 106 moves along track 207 and is commanded by controller 208 as described below. Different programs may be provided to move the mechanical arm 106. Wheels may be provided to move within track 207, and other necessary elements (counterweights, pistons, actuators, electronics, and so forth) may be provided.

The primary functionality of mechanical arm 106 is to move linearly or in another acceptable manner between the various stations provided, collecting a lens such as by suction by applying a gas such as air through line 209 to draw the suction cup and collect the lens. Mechanical arm 106 also has the ability to spin the suction cup 201 by spinning piece 203 and guard 202, and gives the suction cup 201 the ability to articulate upward and downward. Devices known in the art that can provide these functions (raising, lowering, spinning, etc.) are sufficient.

Figure 2B:
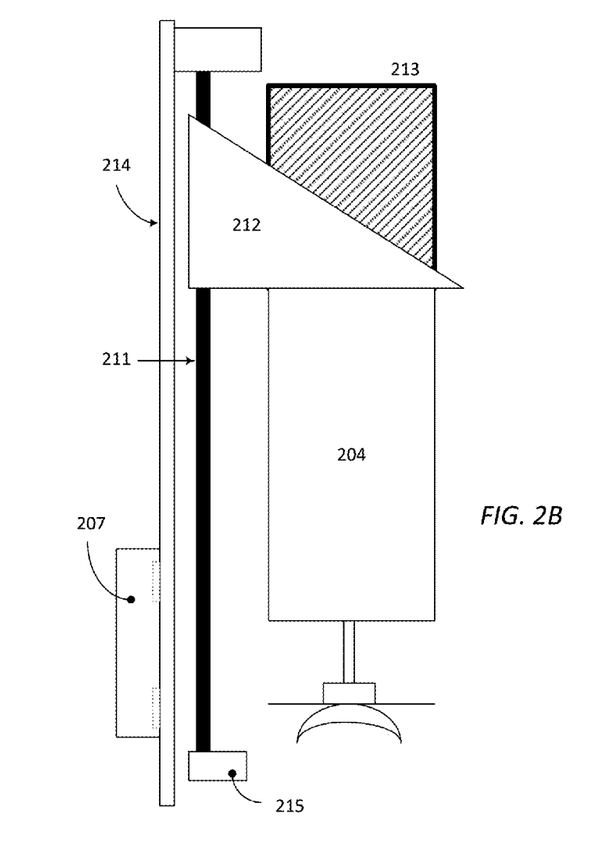
FIG. 2B is a side view of the mechanical arm.

FIG. 2B presents a side view of mechanical arm 106. Rail 211 is one of two rails used to move the mechanical arm components up and down based on controller commands In FIG. 2B, a triangular piece 212 is shown that represents a piece having a lower surface that affixes to the cylinder 204 and facilitates travel along the rails, such as rail 211. Rotational element 213 is shown, configured to provide rotation of the components as described. A rear piece 214 is provided that includes wheels or other appropriate components allowing travel along track 207. Stop 215 is provided at the bottom of rail 211 and may join the two rails. Electrical and gas/suction connections are not shown in FIG. 2B.

Figure 3:
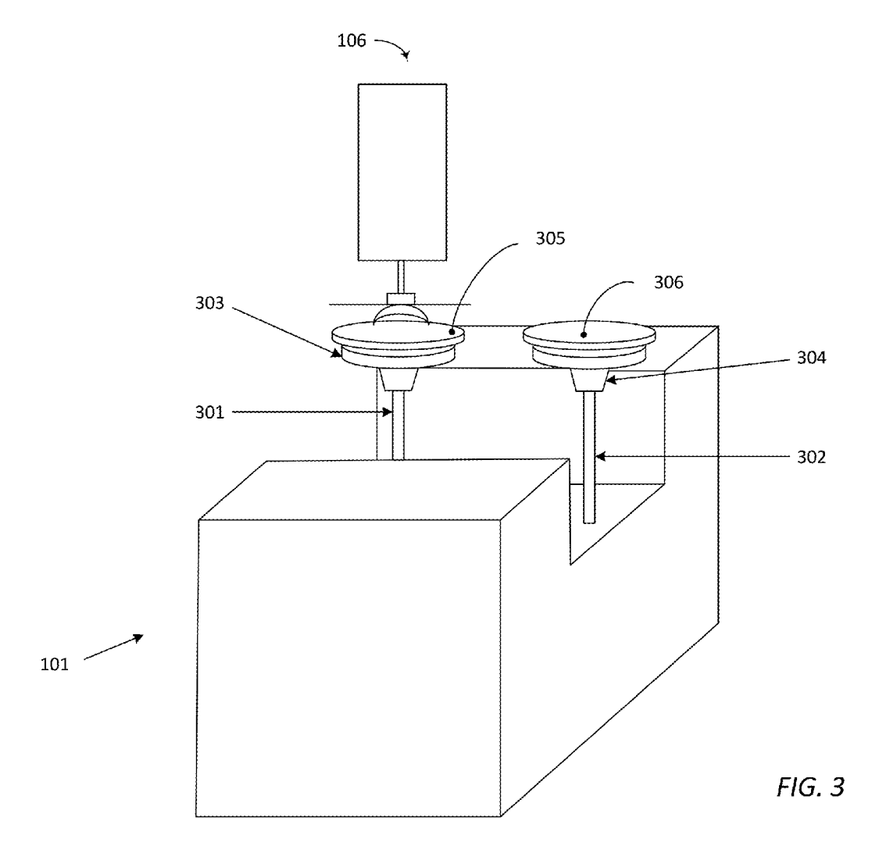
FIG. 3 illustrates an embodiment of the loading (and possibly unloading) station employed in the present design.

One embodiment of loading station 101 is represented in FIG. 3. Loading station 101 includes two pedestals 301 and 302 having holding elements 303 and 304, such as cups, suction cups, or flat or curved surfaces, disposed above pedestals or stands 301 and 302, respectively, and positioned at a given height. The pedestals 301 and 302 may be spring loaded. Height can vary depending on circumstances, and any type of surface or arrangement that can hold one lens or two lenses at a given height is acceptable as a means for maintaining lenses. In certain embodiments, the height can be fixed, while in other embodiments the height can differ or be adjusted, but the intent is for the mechanical arm 106 to pick up one or both of the lenses when the lens or lenses is/are at a known height. Two lenses 305 and 306 are shown in FIG. 3. Mechanical devices, such as pistons or similar raising means, may be provided to raise the height of the lens or lenses, including raising the pedestals 301 and/or 302. An operator initially places the lens or lenses in position, i.e. atop holding elements 303 and/or 304, and mechanical arm 106 collects one lens and subjects the lens to the processes described herein, and may return the lens to its original position when the desired process is complete. Further, an automated loading method may be employed, i.e. a method where lenses are mechanically distributed on a holding element (or elements) such as elements 303 and 304 without an operator placing the lens(es) on the pedestal(s) manually.

Figure 4A:
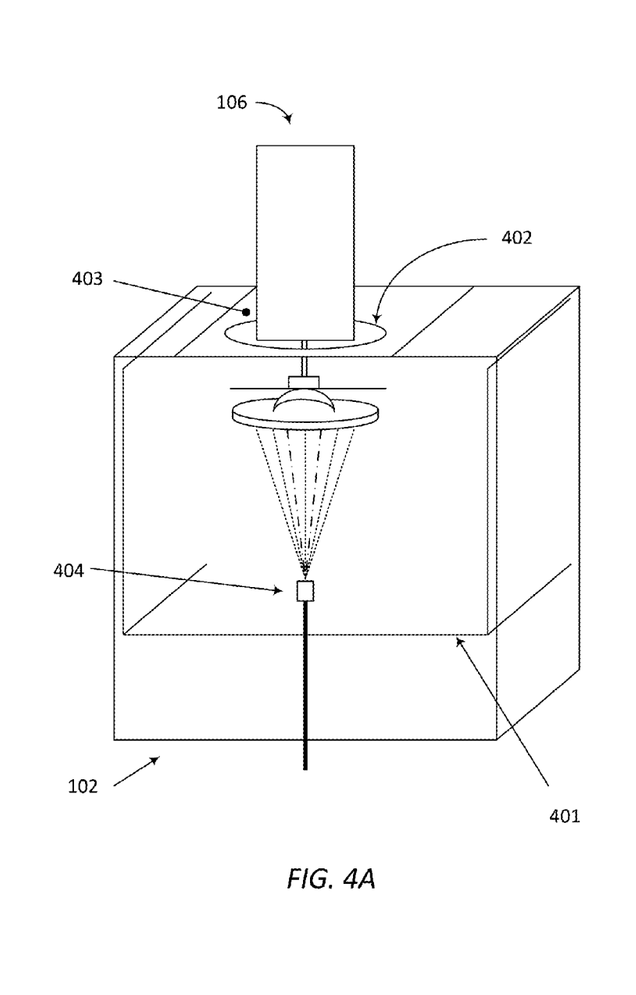
FIG. 4A shows an embodiment of the washing station of the present design.

One embodiment of washing station 102 is shown in FIG. 4A. From FIG. 4A, a solution is provided to chamber 401, such as using a nozzle 404, and at the top of washing station 102 is opening 402. Opening 402 is sized such that guard 202 can fit through with little extra space on the periphery of the guard 202. In this embodiment, a plastic piece 403 is provided with opening 402 where plastic piece 403 can be removed and replaced, and in this FIG. 4A the opening 402 is a simple circular opening. The device in this embodiment directs fluid, such as water or water including other cleaning components, or other appropriate cleaner, to the lens using nozzle 404. When placed in this position, the lens may be spun and may be cleaned on one side. Chamber 401 is preferably watertight, and solution may be evacuated through the base of washing station 102, such as by a drain, or in any other acceptable manner. More than one nozzle 404 may be provided, and nozzle 404 and any other nozzles may be provided at different angles or orientations and may oscillate if desired.

Alternately, a solution container may be provided (not shown in this view) and the lens submerged or disposed within solution in a chamber. Solution may be provided to washing station 102 in any other acceptable way, such as via an external fluid source connected to the chamber 401. In operation, the guard 202 is typically positioned close to and/or below the upper surface of the washing station 102 during the fluid application (washing) procedure such that the guard prevents fluid from leaving the washing station 102.

Figure 4B:
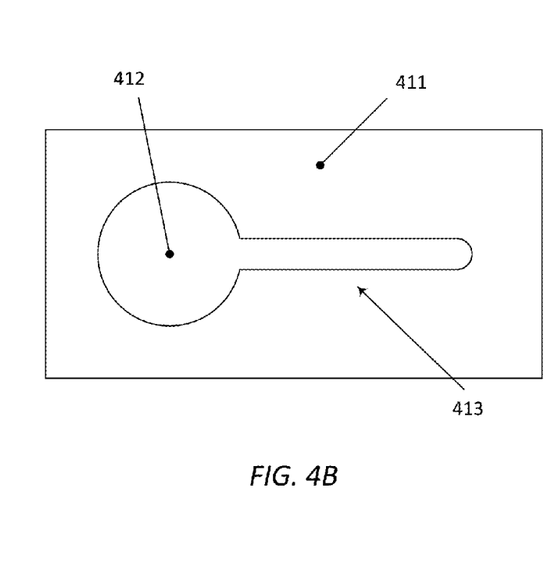
FIG. 4B illustrates an alternative cover that may be employed with the washing station of the current design.

FIG. 4B illustrates an alternative cover 411 positionable atop washing station 102, with a circular opening 412 and a channel 413 permitting the mechanical arm 106 to position the guard, suction cup, and lens below the surface of alternative cover 411 through circular opening 413, and enabling mechanical arm 106 to travel along channel 413 such that the piece 203 fits through, with guard 202 below the surface of alternative cover 411. Mechanical arm 106 positions the lens at the far right end of the alternative cover 411 in the orientation shown. Such a construct facilitates use of a smaller chamber, such as less than half the footprint of the entire washing station, with a relatively low risk of cleaning fluid (e.g. water, deionized water, or distilled or other purified water) splashing onto device components or out of the washing station 102. The nozzle or nozzles providing fluid (distilled water, de-ionized water, etc.) may be grounded, such as via a grounding strap (not shown), to decrease the possibility of a charge building up on the lens. Multiple nozzles may be provided, and they may oscillate, including according to the angular description provided below.

Figure 5:
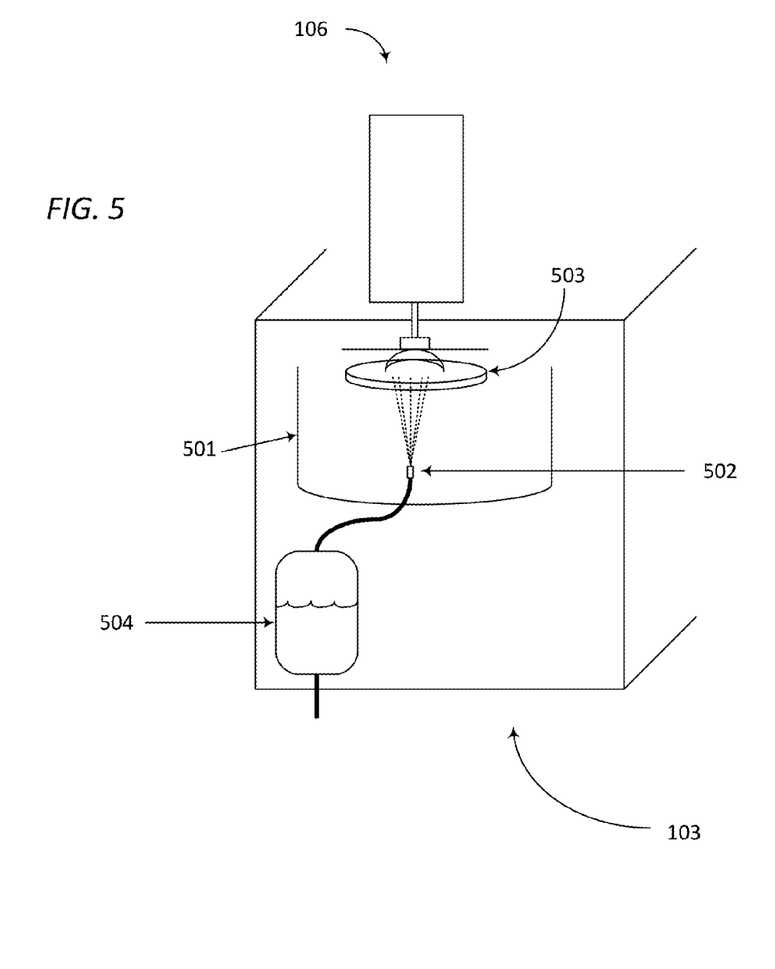
FIG. 5 illustrates an embodiment of the coating station of the present design.

Coating station 103 coats the lens or lenses and one version of coating station 103 is shown in FIG. 5. Coating station 103 may include an opening (not shown in this view) sized similarly to the guard 202 of mechanical arm 106 such that the guard 202 may pass through. Coating station 103 may include a spray chamber 501 and may employ spraying mechanisms at various orientations, shown as nozzle 502 in FIG. 5. Again, more than one nozzle may be employed, each oriented at a desired angle, and oscillation of the nozzle(s) or stream(s) may be provided. Coating station 103 facilitates the coating of one side of one lens, typically the bottom side or the side facing away from mechanical arm 106. In this orientation, spray is emitted upward toward the bottom surface of lens 503, and the lens may be spun by mechanical arm 106 if desired. The upper side of the lens 503 may be sprayed but the top of the lens 503 may be obscured by the devices, e.g. suction cup, employed by the mechanical arm 106 to hold the lens. Operation and spraying in this manner is not intended to omit coating the opposite side of the lens. The lens will typically be placed in one orientation, such as outside facing down, and then automatically or manually in the other position, such as outside facing up, to coat both sides of the lens. A container or reservoir 504 including the coating, typically a coating used to coat lenses, such as ophthalmic lenses, may be employed with compression or force selectively applied to the container or reservoir 504, thereby applying coating to the nozzle 502 and lens 503. The primary function of coating station 103 is to evenly coat as much of the lens 503 as practicable. The lens 503 may be held in place, and excess coating may drip to and/or be removed from the bottom of the spray chamber 501. The result is one side and at least the edge of lens 503 being coated in the desired coating.

Figure 6:
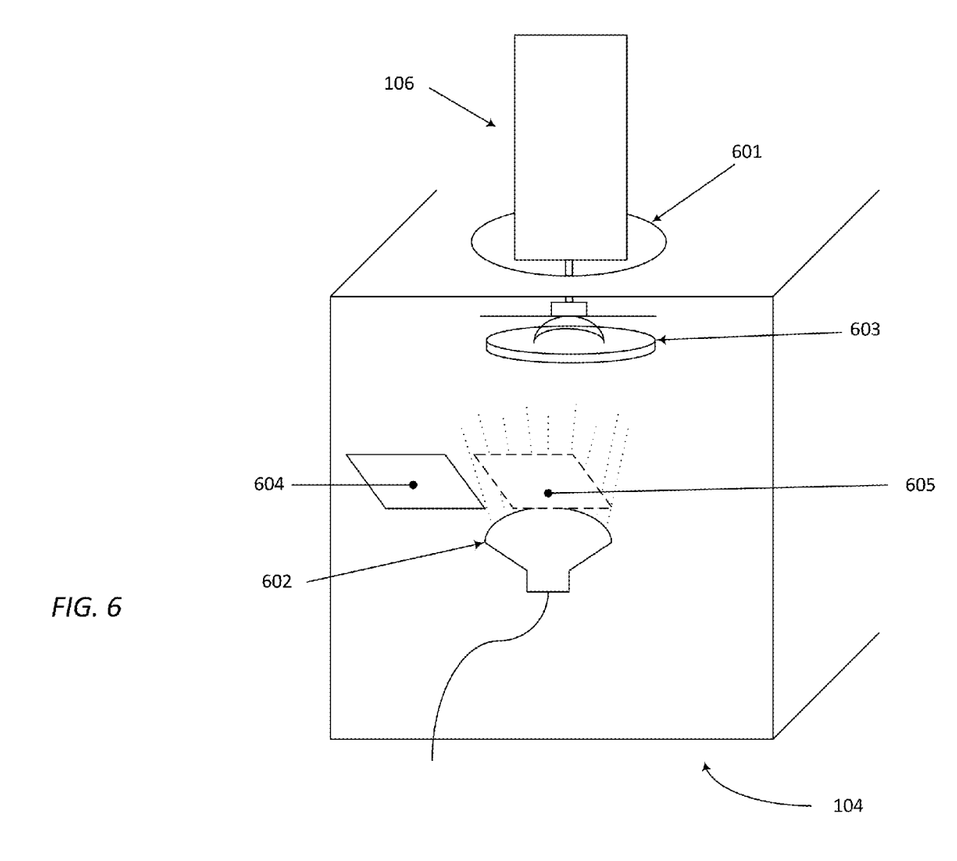
FIG. 6 is a representation of the drying (and/or curing) station according to the present design.

Drying/curing station 104 is shown in FIG. 6 and includes an opening 601 such that the mechanical arm 106 can lower the guard 202 through with little room on the sides. Once inside, the lens may be exposed to radiant energy for drying, typically by ultraviolet light, and in FIG. 6 ultraviolet light source 602 is shown. Additionally or alternately, air drying may be employed, but air drying can introduce unwanted particles on the coated surface, so this is generally less desirable. Drying of wet lenses, i.e. uncoated lenses that have been washed or exposed to a cleaning solution such as water, may occur using a blower (not shown) that draws clean air from a filter, such as a HEPA filter, over the lens surface(s) in a laminar flow manner. The current design does not direct or blow onto or across the lens, but if desired such a design may be employed. When the coating is applied and in need of drying, the present system employs drying/curing station 104 and specifically the UV light source 602 to dry the coating on the lens 603. Also shown in FIG. 6 is an open shutter 604 representing a shutter in an open position and closed shutter 605 representing a shutter in a closed position. Drying/curing station 104 may also include a vent or a fan equipped with a vent (not shown in this view) to dispel and/or circulate air.

As shown in FIG. 1, the mechanical arm 106 is provided with a linear track and can run along the track and employ any one of the stations at any given phase of the coating process. The four stations shown may be placed proximate one another or may be spaced apart, and the mechanical arm may move between stations, raise and lower the lens, and the various stations may be employed and operate in a programmed manner. The present design, a coating machine, operates in a sequential mode performing all functions described below for one or two loaded lenses. If two lens operation is selected, the machine performs one lens sequence first, e.g. the left lens sequence, and the second lens sequence thereafter, e.g. right lens sequence.

A work cycle is performed, exposing the lens to three stations: washing, coating and UV curing. Each station is designed to work at a "mean level" of operation to maximize its efficiency, wherein the machine places the lens' exposed surface within +/−Xmm of the mean level. In this manner, knowledge of the position of the lens at any given point is generally known and control of the mechanical arm 106 can be relatively precise. Additionally, a probe (not shown) may be employed that determines the lens position, may determine lens position based on knowledge of the lens type, and may facilitate positioning the lens at a desired location, i.e. a geometric selected point being located at a desired height within the various stations. If the system has information about the specific type of lens and the probe determines a point or points on the lens, the system can determine orientation of the lens (facing up or down) as well as locations of other parts of the lens (edge, corner position, highest and lowest positions, etc.) In this manner, the thickness of the lens is somewhat immaterial in that the mechanical arm 106 can be positioned at a desired height such that a point or points on the lens are positioned at a known height within the system.

Each station speed and time values of operation depend on several factors including the curvature of the lens (convex vs. concave) and the surface tension of the lens material. In one embodiment, an operator places the lens on each loading position by hand. The two loading stations may be spaced using the VCA (Vision Council of America) standard working tray lens center distance allowing optional loading directly from a tray. An automatic loading feed through conveyor can be provided to enable auto-loading operation in the coating machine.

Operation may begin after the lens is or lenses are loaded and the door is closed. After door closure and the indication to begin is given by a START signal, the machine may secure the door, such as by latching, and the machine may begin moving the mechanical arm 106 toward the lens position with a vacuum pump creating suction in the loading pad or suction cup at the bottom of the mechanical arm 106. The mechanical arm 106 may approach a lens at a relatively slow velocity (micro-stepping) until a vacuum signal (lens presence) is detected. The mechanical arm stops when it encounters a certain vacuum level, while the controller acquires the corresponding encoder count, representing the precise position of the lens/lens surface and the piece employed, e.g. suction cup. The encoder count depends on lens curvature, shape and thickness, and the encoder count may be a different value for different lenses. When the overall process is complete, exhaust air from the vacuum pump is used to eject the lens from the suction cup.

In order to maintain a same or highly similar bottom side surface level with respect of each working station throughout the operational cycle, the vertical mechanical arm 106 axis may rely on or use the loading encoder count to position the lens appropriately at every station of the sequence up to final sequence unloading.

The information related to the lens being coated can be loaded using, for example, an automatic bar code reader, where the code indicates the working surface shape and side location. The processor in the coating machine may rely on a database of information to automatically select a correct processing "recipe," where a processing recipe is a set of speeds and time values for all stations in the process, i.e. a series of process steps or operations. Alternately, in a case of fully manual operation without lens data pre-loading, the machine can evaluate lens shape and thickness to avoid operator recipe selection error. Curvature may be measured by employing a probe or multiple probes on the top and/or bottom surfaces of the lens, where the probe may be provided through suction cup 201 and piece 203, and/or through holding elements 303 and 304 and pedestals or stands 301 and 302. The probe or probes may travel over the lens, providing radii of curvature and thickness values that can determine the lens being employed. However, providing such probes, particularly with the suction cup 201 and piece 203, must result in a design sufficient to maintain the lens through the procedure, i.e. provide sufficient vacuum. Measurement need not be precise, and simple curvature (concave or convex) may be sufficient to ensure proper coating application and machine operation.

Operation

In one embodiment of operation, before moving out of the loading station 101, a bottom surface probe (not shown) may sense the lens to determine its bottom curvature and radius, selecting the corresponding "recipe" for a convex (CX) or concave (CC) surface. An internal center probe may be located at a known Z ref vertical position below a reference loading surface height, where the loading surface is a spring loaded loading pad. The probe may be a single, relatively inflexible probe or a movable probe and more than one point on a lens may be scanned. After loading, the vertical smart axis continues moving the lens down by compressing the loading pad until the probe senses the lens surface. The controller, such as a PLC (programmable logic controller), may determine the shape and thickness of the lens by comparing the Z encoder Delta count increase with the Z_ref value according to the following, where Delta Z is the Z (depth) position of the probe, and and Z_Ref is a reference (depth) position, i.e. an expected position of a flat lens:

If Delta Z>Z_ref then lens shape is CC (concave) and can interpolate its radius

If Delta Z=Z_ref then lens shape is flat

Delta Z<Z_ref then lens shape is CX (convex) and can interpolate its radius

The lens radius calculated value can be used to establish the mean surface Z value in order to properly position the lens through the washing station 102, coating station 103, and curing or drying/curing station 104. As noted, the precise surface and/or precise point on the lens may be positioned using the mechanical arm 106 at a desired height for optimal processing. As described herein, lens washing may occur based on lens position, and precise knowledge of the height of the lens surface may be beneficial in washing the lens, for example.

The system stores the collection height (at the time vacuum is achieved), where collection height is the height at which the lens is collected by the suction cup. This provides positional data regarding the outer extremities of the lens face being coated in relation to the suction cup. A probe or other detection device provided with the pedestal center or mechanism associated with the pedestal enables determination of attributes at or near the center of the lens face being coated in relation to the suction cup. By comparing this data, the system determines lens orientation (concave or convex) and profile (an approximation of the prescription contour or outer radius). This data can be used to adjust the suction cup/lens position during the wash, dry, coat and cure procedures. As an example, the distance between the lens face and the wash nozzle can be consistent throughout the procedure, regardless of shape or orientation of the lens presented in any given cycle. This information and adjustment can similarly benefit the consistency of other module processes.

In one embodiment of washing station 102, the mechanical arm 106 places the spinning lens over a high pressure water jet stream. The mechanical arm 106 moves the spinning lens over the nozzle position, where the nozzle in one embodiment provides an oscillating movement to expose the entire surface to the water jet. The water/cleaning fluid nozzle alignment axis may move with a rocking motion to maintain a generally perpendicular jet stream with respect to the lens surface in accordance with bottom surface probe data, i.e. moving in accordance with the known lens curvature.

The mechanical arm 106 moves the lens to curing or drying/curing station 104 and the lens is dried by forced convection using the radiant lamp generated heat while spinning generally at a higher rate than the wash and coating spinoff speeds. Exposing the lens to light radiation tends to increase surface tension and improve the coating ability during the spin coating cycle in the next station.

The coating station 103 performs a two speed spin coating cycle, with coating provided as described above. Curing station operates using a bi-level power shuttered lamp cycle, wherein the lamp is positioned behind a shutter, and the shutter is opened and closed at desired times to prevent warm-up delay issues. The machine allows inline working cell operation by implementing an edge handling staging conveyor in a perpendicular through path.

Washing progresses considering the following factors. The surface impact spot size created by the (cleaning fluid/water, such as distilled water) nozzle depending on the water divergence angle and is a function of the distance from the nozzle to the lens surface. The nozzle may have a very low divergence angle, such as an angle of five degrees or less, to maintain spot size within the lens positioning design parameters. The wash pressure over the surface spot determines the net diameter or imprint on the surface spot, and is also related to the surface velocity and alignment of the water stream relative to the normal direction of the surface.

In order to expose all the surface of the lens to the high pressure small dot created by the nozzle, the machine may generate a spiral sweeping pattern over the lens by rotating the lens while simultaneously moving the piece 203 on mechanical arm 106 with a radial motion over the nozzle from center to edge. The spiral pattern created by combining the motions provides an increasing surface speed with each corresponding radial, i.e. with each X axis Cartesian robot step increment.

Tangential speed, V, is $\omega*R$, where $\omega$ is angular speed (spindle speed) and R the radius of the lens at the contact point, where the spindle is a rotating element, such as piece 203. To maintain a uniform spot size, the system creates a constant velocity over the sweeping spiral pattern by proportionally reducing the rotational speed of the lens. The controller interpolates the two axes (spindle speed and position) whereby the lens rotational speed is dependent on spindle position.

The lens surface to be washed can be from convex to concave pattern. The wash nozzle positioning is, in one embodiment, fixed and coplanar with the spindle axis at the center position. As the lens spindle moves from center to edge, the angle of alignment to the surface normal increases up to 45 degrees for high base curves. The velocity vector vertical component of the water jet stream decreases in an amount related to the cosine law as $0.707<\cosine \alpha<1.00$ where $\alpha$ is the angle between water jet and surface normal at the contact point. In order to compensate for the decrease in the water speed vector, the velocity of the radial motion or X axis may decrease accordingly following the same cosine law. Since the spindle velocity is related to the X axis positioning, the decrease in spindle velocity will also effect a decrease in the change of the rotational speed, changing the deceleration of the spindle.

From the foregoing, the present system may enable decreased rotation speed due to the precise coverage of the washing jets. Fluid, such as distilled water, directed according to the foregoing angular relationships decreases the need for high speed rotation, and thus lenses can be rotated at a lower speed than in previous designs.

It is to be understood that lenses may be loaded in one orientation, such as outside down, and proceed through the various stations generally in this orientation, with the outside of the lens being washed, dried, coated, and cured and potentially returned to the loading station 101. The lenses may then be inverted, such as with the inside down, after the outside has been cured, and may pass through the various stations such that the inside is washed, dried, coated, and cured. Inversion or movement of the lenses at loading station 101 may be performed by an operator.

Figure 7:
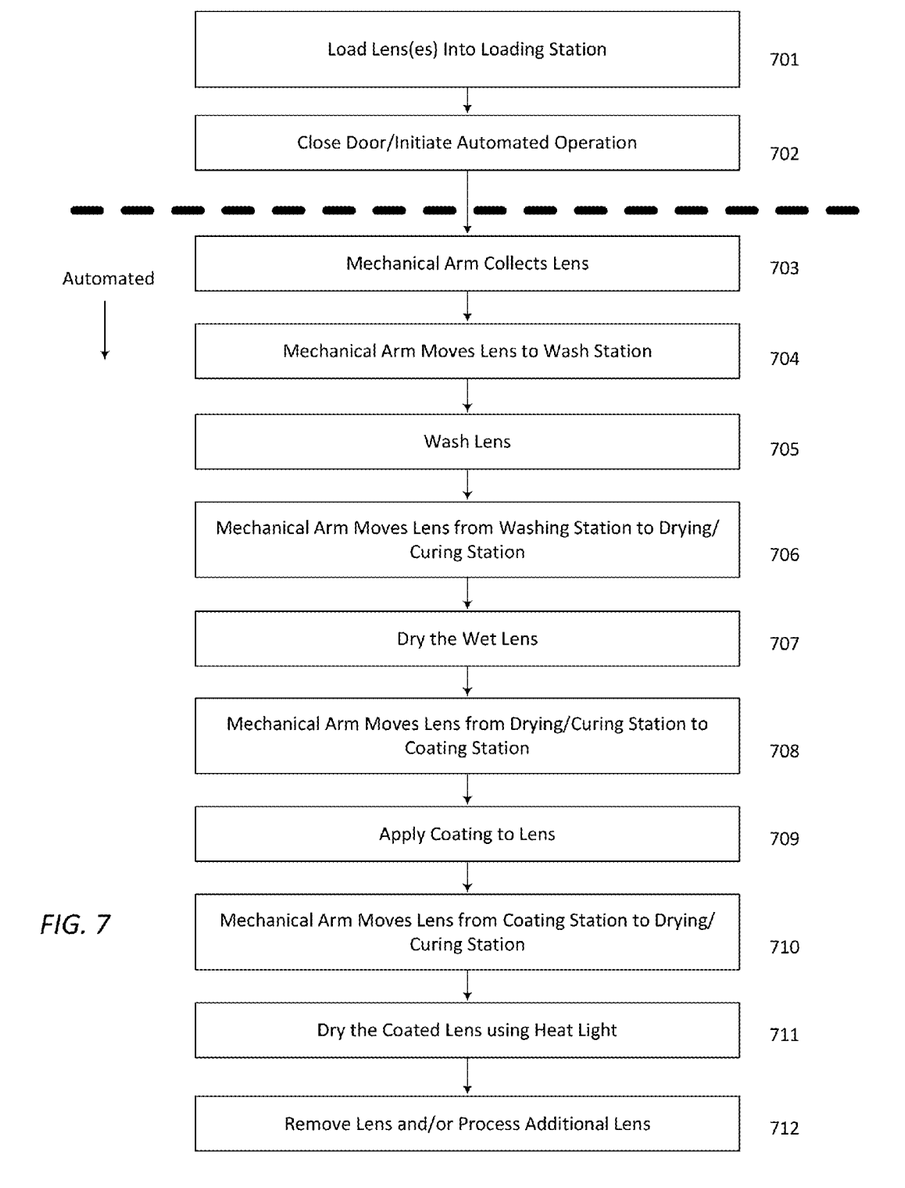
FIG. 7 is a flowchart of one embodiment of the present design.

FIG. 7 illustrates a general flowchart of the operation of the present design. At point 701, a lens or pair of lenses is loaded into the loading station 101. Lenses may be loaded in a particular orientation. When ready for operation, the door is closed at point 702, but another method of turning on the device and initiating may be performed. Points below point 702 are thus performed automatically or without user intervention, and may be programmed as desired, i.e. operating a certain process for a desired period of time or at a certain speed. Point 703 is the removal of the desired lens from the loading station 101 using mechanical arm 106. Not shown in FIG. 7 is the optional sensing of the lens curvature and/or position using probes, but such a step may occur prior to removing the lens from the loading station 101. Point 703 may employ a suction cup or other holding device employed by mechanical arm 106 and this may be used to lift the lens as described above. At point 704, the mechanical arm moves and transports the lens to wash station 102, places the lens into the wash station chamber, and at point 705 provides cleaning fluid or water to the exposed side of the lens while spinning the lens. After a period of time, operation progresses to point 706, where the mechanical arm removes the lens from the wash station 102 and transports the lens to drying/curing station 104. At point 707, the shutter is opened and UV light energy provided to the washed side of the lens, with the light source directed upward toward the lens. After a period of time, at point 708, the UV shutter is closed and the lens is removed by the mechanical arm 106 from the drying/curing station 104 and transported to coating station 103 and placed within the coating station 103.

At point 709, coating is applied to the lens, typically by an upward jet of coating directed at the lens, typically while the mechanical arm 106 is spinning the lens. Coating is applied for a predetermined amount of time, and at point 710 the mechanical arm 106 removes the coated and spun lens from coating station 103 and transfers it to drying/curing station 104. At point 711, the system opens the shutter, exposing the coated lens to radiant energy such as UV light to cure the coating. After a period of time, the lens is removed from the drying/curing station 104 and may be either maintained and removed by an operator who, for example, opens the door and possibly powers down the system, removing suction from the suction cup at the end of mechanical arm 106 or releasing another holding mechanism used to hold the lens, or by the mechanical arm 106 by transitioning from the drying/curing station 104 to the loading station 101, releasing the lens by releasing the pressure or suction on the suction cup and depositing the coated lens on an appropriate one of the stands/pedestals on the loading/unloading station 101. The operator may then open the door or otherwise cease operation and may invert the lens on the pedestal and repeat the process. Alternately, the second lens may be retrieved and processed according to FIG. 7. Note that if desired, once the coated lens has been dried or cured, the lens need not be returned to the loading/unloading station 101, but can the processed lens may be held in place such as over one of the stations and control may be provided wherein an operator can gain access to the enclosure, such as by opening a door, and the pressure or suction of the mechanical arm released, allowing removal of the lens.

Further, programming may be provided wherein an outside or outer surface of a first lens is treated, outside of a second lens treated, and then the lenses each inverted, and inside of the first lens treated, and inside of the second lens treated. Other combinations or single desired lens processing (full processing or specialized processing, such as only washing a lens) may occur and may be programmed into the device.

Hence with respect to the individual stations, power and control may be provided to loading and unloading station 101. If simple pedestals are used without probes, no power is required. If probes or movable pedestals are required, power is required. Wash station 103 requires a source of cleaning fluid or water and power or some type of force to apply the cleaning fluid or water, as well as a drain to remove fluid. Fluid may collect and be removed manually or dumped out, but a drain is preferable, to a disposal unit or other receptacle for appropriate recycling or disposal. Coating station 103 may provide the coating substance, which in the case of ophthalmic lenses may be a urethane based coating that is typically reactive to radiant energy such as ultraviolet (UV) light, or some other appropriate coating. Such coating is typically provided in an appropriate container and pressure applied, such as by using an electric pump, and sprayed through a nozzle toward the lens. Again, a collection arrangement is employed, which may be a drain or simply manual removal of the excess or used coating from the coating station 103. Hence coating station 103 requires a source of coating, such as a reservoir, power, and a receptacle for collecting excess coating or a drain, and spraying occurs subject to control by the controller. Drying/curing station 104 includes a drying device, such as a radiant source (e.g. an ultraviolet light) requiring a power source and a shutter also requiring a power source, and may include a fan or other moving air source. While in certain instances use of compressed air is not desirable, such as when drying a coated lens, compressed air or a fan may be employed to promote circulation of air and a relative uniformity in the heat being applied by the ultraviolet light source. Other sources of heat may be employed. But electricity and control are preferably provided to drying/curing station 104.

One alternate embodiment of the present design does not employ air between the radiant light source and the lens, but instead employs a quartz plate or quartz grating, screen, or filter between the radiant light source and the lens. A quartz plate can reduce some of the radiant energy therefore changing the characteristics of the dry/cure method. A dichroic filter added to a quartz plate and possibly the UV lamp reflector enables further manipulation of the dry/cure characteristics. The lens may alternately be dried with the shutter closed, reducing lens temperature.

In addition to or as an alternative to the shutter mechanism, the present design can also include an independently controlled moving window mechanism at the drying/curing station 104, which could be moved as needed during either the drying or curing operations. Such a moving window mechanism may be provided between the shutter and the lens, such as above elements 604 and 605 in FIG. 6, and may in certain instances provide improved control over lens temperature and preparation for coating.

Figure 8:
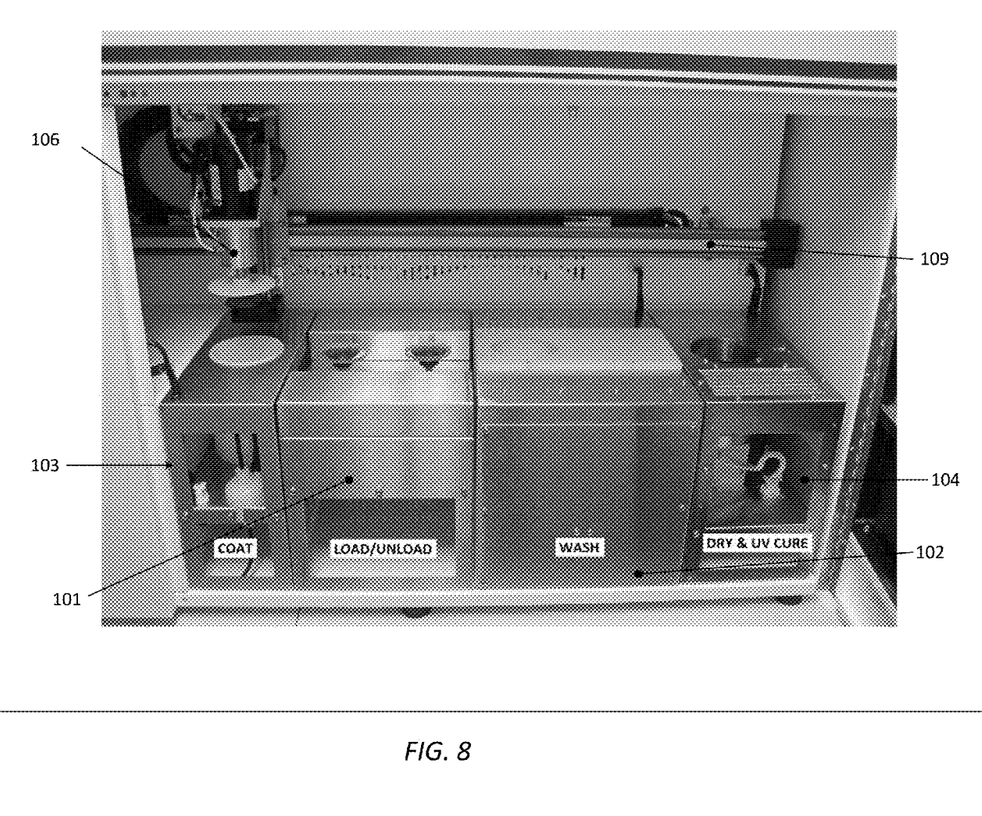
FIG. 8 is a photographic representation of a working version of the present design including the various stations, the mechanical arm, and the linear track along which the mechanical arm operates between stations.

One embodiment of the current design is shown in FIG. 8, including loading station 101, washing station 102, coating station 103, drying/curing station 104, and mechanical arm 106 which moves along the track on command by the controller between the various stations. The various stations are contained within an enclosure, and in this view no door is shown but one is typically provided. Exposure to the various stations may be any amount of time and may be for a predetermined time value, from seconds to tens of seconds and even longer in some situations.

Figure 9:
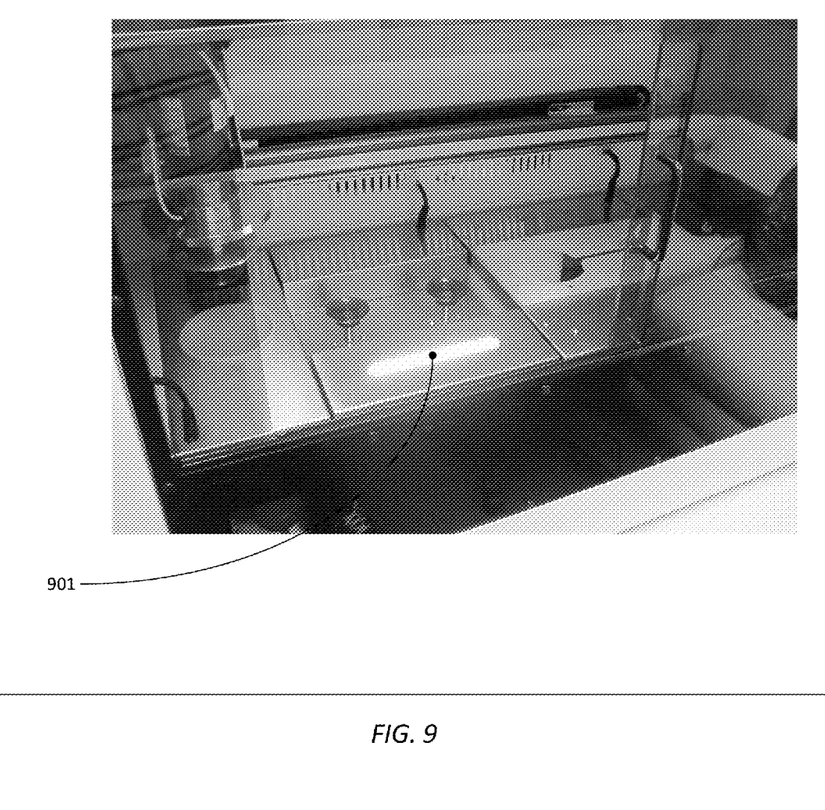
FIG. 9 is a photographic representation of the device including an inspection light.

Additional features may be provided as desired. One such additional feature is an inspection light 901, shown in FIG. 9, added to the loading station proximate the loading door in this embodiment. The inspection light 901 enables an operator to visually inspect a lens or multiple lenses for defects before, during, or after processing while the lens or lenses remain inside the clean environment, such as an environment including HEPA filtered air. Electrical power must be provided to such a light, and any type of necessary connection for additional equipment must be provided (e.g. power, fluid, control, etc.)

Control may be provided by a controller having a visual interface, enabling the user to select a program having a sequence of steps or in some cases allowing the user to select his or her own functions to be performed. The controller may include a user interface with a touchscreen or buttons, and any programmable logic controller able to provide the functionality called for herein may be employed. User selection may be employed but is optional, and the controller has the ability to issue commands facilitating the transition between stations suggested by, for example, the functions called out in FIG. 7.

Another way of describing operation of the design is as follows. An operator opens a load door and loads a pair of lenses onto two spring loaded pedestals. When the door is closed, the operator selects the appropriate process program and starts the processing cycle. The apparatus automatically moves a vacuum cup over the lens and picks it up (in a pick-and-place type operation). The lens is transferred into a washing bowl for cleaning and is sprayed with DI water (distilled or deionized water). The device spins the lens to remove most of the water. The lens is transferred to a UV station and may be positioned in front of a blower. A UV or other radiant lamp provides radiation (UV, infrared, etc.) to facilitate the drying process. The lens is spun during drying. The device transfers the lens to a coating station where it is spun and sprayed with coating. The spinning process provides an even coating film. The lens is then transferred to the UV station where it is cured. The lens is returned to the pedestal and the machine will either process the next lens, or finish the cycle.

The present design thus includes a coating apparatus comprising a mechanical arm configured to receive and maintain a lens in a desired orientation, a coating station configured to coat the lens, a drying station configured to dry the lens using radiant energy, and a programmable controller configured to control the mechanical arm to move along a linear track between the coating station and drying station and expose the lens to the coating station for a coating procedure and the drying station for a drying procedure for a predetermined amount of time. Other stations may be provided, such as a washing station and a loading station.

Additionally, the present design comprises a lens coating apparatus comprising means for coating at least one side of an optical lens, means for drying/curing the optical lens using radiant energy, means for receiving and maintaining the optical lens in a desired orientation, and means for controlling position of the optical lens by directing the receiving means along a linear track to facilitate coating the optical lens using the coating means and drying the optical lens using the drying means.

According to a further embodiment of the present design, there is provided a method for processing an optical lens. The method includes receiving and maintaining the optical lens using a mechanical arm configured to maintain the optical lens in a desired orientation, directing the mechanical arm maintaining the optical lens to an optical lens coating position and coating at least one side of the optical lens, and directing the mechanical arm maintaining the optical lens to an optical lens drying/curing position and drying the optical lens using radiant energy. The mechanical arm is controlled to move along a linear track between the optical lens coating position and the optical lens drying/curing position.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A coating apparatus comprising an enclosed area, the coating apparatus comprising:
   a mechanical arm configured to receive and maintain a lens in a desired orientation;
   a loading station comprising a loading platform configured to receive the lens and maintain the lens within the enclosed area;
   a coating station configured to coat the lens while the lens is oriented in the desired orientation, wherein the coating station comprises a spraying mechanism that directs an upward spray toward a bottom surface of the lens;
   a drying/curing station configured to cure the bottom surface of the lens oriented in the desired orientation using an upward transmission of radiant energy; and
   a programmable controller configured to control the mechanical arm to move along a linear track between the coating station and drying/curing station and expose the lens to the coating station for a coating procedure and the drying/curing station for a curing procedure for a predetermined amount of time;
   wherein the programmable controller is further configured to control the mechanical arm to move linearly and collect the lens from the loading station without operator handling of the lens.

2. The coating apparatus of claim 1, further comprising a washing station, wherein the programmable controller is further configured to control the mechanical arm to move along the linear track between the washing station, coating station, and drying/curing station and expose the lens to the washing station for a washing procedure for a further amount of time.

3. The coating apparatus of claim 2, wherein the programmable controller is further configured to move along the linear track between the loading station, washing station, coating station, and drying/curing station.

4. The coating apparatus of claim 3, wherein the loading station comprises a probe employed with the programmable controller to sense an attribute of the lens while positioned at the loading station within the enclosed area, wherein the attribute of the lens comprises at least one from the group consisting of lens position, lens curvature, and lens thickness.

5. The coating apparatus of claim 4, further wherein the probe is configured to operate with the programmable controller to:
   determine a lowest point on the lens and is configured to maintain the lowest point on the lens at a desired height in the washing station, coating station, and drying/curing station; and
   employ desired speeds and times for exposure of the lens in the washing station, coating station, and drying/curing station.

6. The coating apparatus of claim 1, wherein the lens comprises an ophthalmic lens and coating applied to the ophthalmic lens is reactive to radiant energy.

7. The coating apparatus of claim 1, wherein the drying/curing station comprises a radiant source covered by a shutter operated by the programmable controller and the drying/curing station is free of devices configured to blow air directly at the lens.

8. The coating apparatus of claim 1, wherein the mechanical arm comprises a suction cup configured to maintain the lens and transmit the lens to the coating station and the drying/curing station.

9. The coating apparatus of claim 1, wherein the mechanical arm comprises an element configured to spin the lens while providing the lens to the coating station.

10. A lens coating apparatus comprising an enclosed area, the lens coating apparatus comprising:
    means for coating at least one side of an optical lens while oriented in a desired orientation, wherein the means for coating comprises a spraying mechanism that directs an upward spray toward a bottom surface of the optical lens;
    means for drying/curing the bottom surface of the optical lens oriented in the desired orientation using an upward transmission of radiant energy;
    means for receiving the optical lens and maintaining the optical lens in a desired orientation;
    means for controlling position of the optical lens by directing the receiving means along a linear track to facilitate coating the optical lens using the coating means and drying the optical lens using the drying means; and
    a hands-free loading station comprising a loading platform configured to receive the optical lens and maintain the optical lens within the enclosed area for collection by the receiving means, wherein means for controlling position is configured to control the receiving means to move linearly and collect the optical lens from the hands-free loading station without operator handling of the optical lens.

11. The lens coating apparatus of claim 10, further comprising means for washing the lens, wherein the means for controlling position of the optical lens is further configured to direct the receiving means along the linear track between the means for washing, means for drying/curing, and means for coating.

12. The lens coating apparatus of claim 11, wherein the means for controlling position of the optical lens is further configured to move along the linear track between the loading station, means for washing, means for drying/curing, and means for coating.

13. The lens coating apparatus of claim 12, wherein the loading station comprises a probe configured to enable sensing of an attribute of the optical lens while positioned at the loading station.

14. The lens coating apparatus of claim 10, wherein the optical lens comprises an ophthalmic lens and coating applied to the ophthalmic lens is reactive to the radiant energy.

15. The lens coating apparatus of claim 10, wherein the means for drying/curing comprises a lamp covered by an openable shutter and the means for drying/curing is free of devices configured to direct air at the lens.

16. The lens coating apparatus of claim 10, wherein the receiving means comprises a suction cup configured to maintain the lens and transmit the lens to the means for coating and the means for drying/curing.

17. The lens coating apparatus of claim 10, wherein the receiving means is configured to spin the optical lens while providing the optical lens to the coating station.

18. A coating apparatus comprising an enclosed area, the coating apparatus comprising:
 a mechanical arm configured to receive and maintain a lens in a desired orientation;
 a loading station comprising a loading platform configured to receive the lens and maintain the lens within the enclosed area;
 a coating station configured to coat the lens while the lens is oriented in the desired orientation, wherein the coating station comprises a spraying mechanism that directs an upward spray toward a bottom surface of the lens;
 a drying/curing station configured to cure the bottom surface of the lens oriented in the desired orientation using an upward transmission of radiant energy;
 a linear track configured to receive and guide the mechanical arm in a linear path; and
 a programmable controller configured to:
  control the mechanical arm along the linear track between the loading station, coating station and drying/curing station; and
  expose the lens to the coating station for a coating procedure and the drying/curing station for a curing procedure,
 wherein the programmable controller is further configured to control the mechanical arm to move linearly and collect the lens from the loading station without operator handling of the lens.

19. The coating apparatus of claim 18, further comprising a washing station, wherein the programmable controller is further configured to control the mechanical arm to move along the linear track between the washing station, coating station, and drying/curing station and expose the lens to the washing station for a washing procedure for a further amount of time.

20. The coating apparatus of claim 19, wherein the programmable controller is further configured to control the mechanical arm to collect the lens from the loading station and move along the linear track between the loading station, washing station, coating station, and drying/curing station.

21. The coating apparatus of claim 18, wherein the lens comprises an ophthalmic lens and coating applied to the ophthalmic lens is reactive to radiant energy.

* * * * *